US012400146B1

(12) United States Patent
Shah et al.

(10) Patent No.: US 12,400,146 B1
(45) Date of Patent: Aug. 26, 2025

(54) METHODS AND APPARATUS FOR AUTOMATED ENTERPRISE MACHINE LEARNING WITH DATA FUSED FROM MULTIPLE DOMAINS

(71) Applicant: CIPIO Inc., Fairfax, VA (US)

(72) Inventors: Harshil Shah, Centreville, VA (US); Manoj Kumar Goyal, Fremont, CA (US); Jin Yu, Union City, CA (US)

(73) Assignee: CIPIO Inc., Fairfax, VA (US)

( * ) Notice: Subject to any disclaimer, the term of this patent is extended or adjusted under 35 U.S.C. 154(b) by 616 days.

(21) Appl. No.: 17/717,527

(22) Filed: Apr. 11, 2022

Related U.S. Application Data

(60) Provisional application No. 63/173,737, filed on Apr. 12, 2021.

(51) Int. Cl.
*G06N 20/00* (2019.01)

(52) U.S. Cl.
CPC .................................. *G06N 20/00* (2019.01)

(58) Field of Classification Search
CPC ..................................................... G06N 20/00
See application file for complete search history.

(56) References Cited

U.S. PATENT DOCUMENTS

| | | | |
|---|---|---|---|
| 6,925,454 B2 * | 8/2005 | Lam | G06Q 10/063 706/45 |
| 10,733,230 B2 | 8/2020 | Jo | |
| 11,197,036 B2 | 12/2021 | Chao | |
| 11,704,893 B2 | 7/2023 | Ren et al. | |
| 11,886,311 B2 * | 1/2024 | Shen | G06F 11/2263 |
| 11,898,932 B2 * | 2/2024 | Zhu | G01M 13/045 |
| 2010/0042563 A1 * | 2/2010 | Livingston | G06F 18/2321 703/2 |
| 2014/0214895 A1 * | 7/2014 | Higgins | G06F 16/9535 707/770 |
| 2014/0272884 A1 * | 9/2014 | Allen | G06N 5/04 434/322 |
| 2016/0092561 A1 | 3/2016 | Liu et al. | |

(Continued)

FOREIGN PATENT DOCUMENTS

| | | |
|---|---|---|
| CN | 109922373 A | 6/2019 |
| CN | 111726536 A | 9/2020 |

(Continued)

*Primary Examiner* — David E Choi
(74) *Attorney, Agent, or Firm* — COOLEY LLP

(57) ABSTRACT

A method can include identifying a first set of data columns in a first data domain and a second set of data columns in a second data domain that are similar. The method can further include selecting a first subset of data columns in the first data domain and a second subset of data columns in the second data domain that have matching parameters. The method can further include arranging the first subset of data columns and the second set of data columns into a multi-domain dataset. Each column in the multi-domain dataset can be classified into structured data or unstructured data. The structured data can be used for training a machine learning model. The method can further include replacing under-performing features in the second data domain before replacing under-performing features in the first data domain. The method can further include re-training the machine learning model after replacing under-performing features.

20 Claims, 5 Drawing Sheets

(56) References Cited

U.S. PATENT DOCUMENTS

| | | | |
|---|---|---|---|
| 2020/0104641 A1* | 4/2020 | Alvelda, VII | G06N 3/045 |
| 2022/0292389 A1* | 9/2022 | Seabolt | G06N 20/00 |
| 2023/0162502 A1 | 5/2023 | Patel et al. | |
| 2023/0245451 A1 | 8/2023 | Zhang | |
| 2024/0124004 A1 | 4/2024 | Donderici | |
| 2025/0008188 A1 | 1/2025 | Maity et al. | |

FOREIGN PATENT DOCUMENTS

| | | |
|---|---|---|
| CN | 112929744 A | 6/2021 |
| EP | 3598371 A1 | 1/2020 |

\* cited by examiner

200

| Identify a first set of data columns in a first data domain and a second set of data columns in a second data domain that have similar data types. 201 |

| Select a first subset of data columns from the first set of data columns in the first data domain and a second subset of data columns from the second set of data columns in the second data domain that have matching values. 202 |

| Arrange the first subset of data columns and the second set of data columns into a multi-domain dataset. Each column in the multi-domain dataset include an attribute from the first set of data columns or the second set of data columns. Each row in the multi-domain dataset include multi-domain data from the first data domain and the second data domain. 203 |

| Classify each column in the multi-domain dataset into structured data or unstructured data. Columns with structured data are mapped to a set of features for training at least one machine learning model. Each feature from the set of features is associated with the first data domain or the second data domain. 204 |

| Replace a first set of under-performing features from a subset of features from the set of features in the second data domain, the under-performing features identified by evaluating the at least one machine learning model. 205 |

| Replace a second set of under-performing features from a subset of features from the set of features in the first data domain, after the second data domain. The under-performing features are identified by evaluating the at least one machine learning model. A predetermined portion of features from the subset of features from the set of features in the first data domain is retained. 206 |

| Re-train the at least one machine learning model after replacing the first set of under-performing features and the second set of under-performing features. 207 |

FIG. 2

Domain Profile

| User ID | Attribute 1 | Attribute 2 | Attribute 3 | Attribute... |
|---------|-------------|-------------|-------------|--------------|
|         |             |             |             |              |
|         |             |             |             |              |
|         |             |             |             |              |

FIG. 3

METHODS AND APPARATUS FOR AUTOMATED ENTERPRISE MACHINE LEARNING WITH DATA FUSED FROM MULTIPLE DOMAINS

CROSS REFERENCE TO RELATED APPLICATIONS

This application claims priority to and the benefit of U.S. Provisional Application No. 63/173,737, filed Apr. 12, 2021, entitled "Methods and Apparatus for Automated Enterprise Machine Learning with Data Fused from Multiple Domains", the content of which is hereby incorporated in its entirety.

This application is related to U.S. Provisional Application No. 63/173,734, entitled "Methods and Apparatus for Automatic Generation and Management of Domain-Centric Enterprise Machine Learning Models", filed on Apr. 12, 2021. The disclosure of the application identified above is incorporated herein by reference for all purposes.

TECHNICAL FIELD

The present disclosure relates to the field of artificial intelligence and/or machine learning, and particularly to cross-domain machine learning models.

BACKGROUND

Some known automated machine learning apparatus and methods can be useful in, for example, fraud detection. Some known apparatus and methods for automated machine learning, however, do not effectively fuse cross-domain data. Thus, a need exists for improved apparatus and methods for automated machine learning.

SUMMARY

In some embodiments, a method can include identifying a first set of data columns in a first data domain that have a plurality of data types. The method can further include identifying a second set of data columns in a second data domain that have a plurality of data types that are the same or substantially similar to the plurality of data types of the first data domain. The method can further include selecting a first subset of data columns in the first data domain and a second subset of data columns in the second data domain that have matching parameters. The method can further include arranging the first subset of data columns and the second set of data columns into a multi-domain dataset. Each column in the multi-domain dataset can be classified into structured data or unstructured data. The structured data can be used for training a machine learning model. The method can further include replacing under-performing features in the second data domain before replacing under-performing features in the first data domain. The method can further include re-training the machine learning model after replacing under-performing features in the first data domain and the second data domain.

BRIEF DESCRIPTION OF THE DRAWINGS

FIG. 2 is a flowchart showing a cross-domain machine learning method, according to an embodiment.

FIG. 3 is a schematic illustration of domain profile, according to an embodiment.

DETAILED DESCRIPTION

Non-limiting examples of various aspects and variations of the embodiments are described herein and illustrated in the accompanying drawings.

Apparatus and methods for cross-domain machine learning described herein can be used to (1) automatically merge data from multiple data domains to produce multi-domain data and (2) train, deploy, and test cross-domain enterprise machine learning models based on the multi-domain data. Known automated machine learning methods and apparatus often focus on a specific application and data domain. Although challenging, it is advantageous to merge data from multiple data domains for insights that cannot be achieved from one data domain. To solve the abovementioned challenge, apparatus and methods for cross-domain machine learning described herein automatically select data that have identifiers in common across data domains and arrange the data in a multi-domain dataset. Moreover, apparatus and methods for cross-domain machine learning described herein train, deploy, and test machine learning models based on the multi-domain dataset.

In one example, a first data domain can include telecom data and a second data domain can include fitness data. Apparatus and methods for cross-domain machine learning described herein can fuse or merge the telecom data and the fitness data from the first data domain and the second data domain to produce machine learning models that can, for example, generate recommendation to a user a closest gym to the users, based in part on the telecom data that typically would be considered so unrelated to the fitness domain as to be irrelevant.

Figure 1:
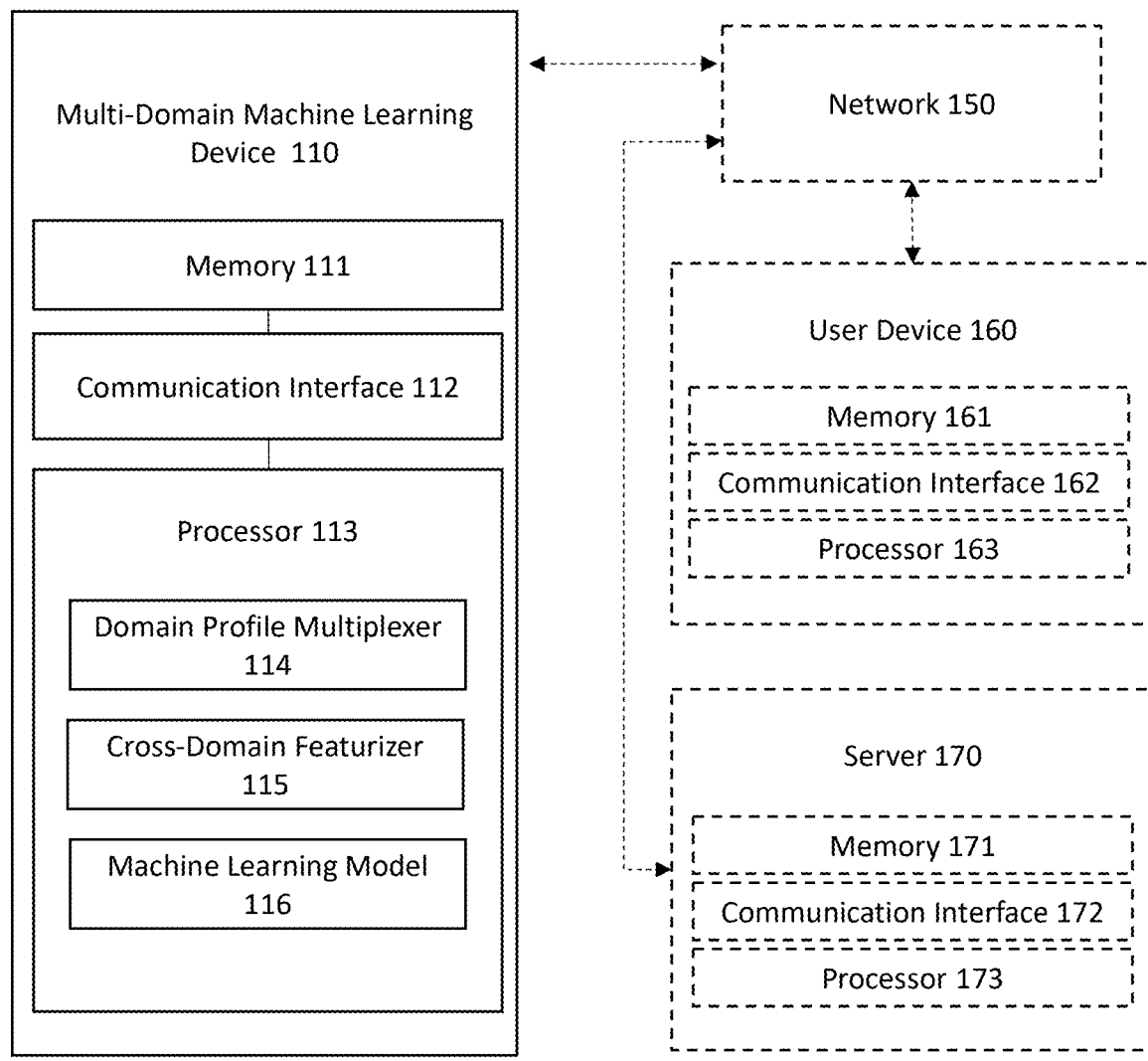
FIG. 1 is a schematic illustration of a cross-domain machine learning device, according to an embodiment.

FIG. 1 is a schematic illustration of a cross-domain machine learning device 110, according to an embodiment. The cross-domain machine learning device 110 (also referred to as the 'compute device'), includes a memory 111, a communication interface 112, and a processor 113 and can be used to store, analyze, and communicate data. The cross-domain machine learning device 110 can be optionally coupled to a user device 160 and/or a server 170 via a network 150, to receive, transmit, and/or process data. The data used by cross-domain machine learning device 110 are from multiple data domains (e.g., 2 data domains, 3 data domains, 10 data domains, 20 data domains, 30 data domains, 100 data domains, and/or the like) and can include structured data (e.g., tabular, columnar, and/or the like) and/or unstructured data (e.g., free-form text data, images, and/or the like). In one example, the data can include structured enterprise data in diet data domain, fitness data domain, medical record data domain, financial data domain, telecommunication network data domain, demographic data domain, customer churn data domain, and/or the like.

The memory 111 of the cross-domain machine learning device 110 can be, for example, a memory buffer, a random access memory (RAM), a read-only memory (ROM), a hard drive, a flash drive, a secure digital (SD) memory card, an external hard drive, an erasable programmable read-only memory (EPROM), an embedded multi-time programmable (MTP) memory, an embedded multi-media card (eMMC), a universal flash storage (UFS) device, and/or the like. The memory 111 can store, for example, diet data, fitness data, medical record data, financial data, telecommunication network data, demographic data, customer churn data, and/or the like. The memory 111 can further store one or more machine learning algorithms, machine learning models, and/or code that includes instructions to cause the processor 113 to execute one or more processes or functions (e.g., a domain profile multiplexer 114, a cross-domain featurizer 115, and/or a machine learning model 116).

The communication interface 112 of the cross-domain machine learning device 110 can be a hardware component of the cross-domain machine learning device 110 to facilitate data communication between the cross-domain machine learning device 110 and external devices (e.g., the user device 160 and/or the server 170) or internal components of the cross-domain machine learning device 110 (e.g., the memory 111, the processor 113). The communication interface 112 is operatively coupled to and used by the processor 113 and/or the memory 111. The communication interface 112 can be, for example, a network interface card (NIC), a Wi-Fi® module, a Bluetooth® module, an optical communication module, and/or any other suitable wired and/or wireless communication interface. The communication interface 112 can be configured to connect the cross-domain machine learning device 110 to the network 150. In some instances, the communication interface 112 can facilitate receiving and/or transmitting data (e.g., the fitness data, the health records, the transaction data, the loyalty data, and/or the like) via the network 150. More specifically, in some implementations, the communication interface 112 can facilitate receiving and/or transmitting the data, machine learning algorithm, and/or machine learning models through the network 150 from/to the user device 160 and/or the server 170.

The processor 113 can be, for example, a hardware based integrated circuit (IC) or any other suitable processing device configured to run or execute a set of instructions or a set of codes. For example, the processor 113 can include a general purpose processor, a central processing unit (CPU), an accelerated processing unit (APU), an application specific integrated circuit (ASIC), a field programmable gate array (FPGA), a programmable logic array (PLA), a complex programmable logic device (CPLD), a programmable logic controller (PLC), a graphics processing unit (GPU), a neural network processor (NNP), and/or the like. The processor 113 can be operatively coupled to the memory 111 and/or communication interface 112 through a system bus (for example, address bus, data bus, and/or control bus; not shown). The processor 113 includes the domain profile multiplexer 114, the cross-domain featurizer 115, and/or the machine learning model 116. In some configurations, each of the domain profile multiplexer 114, the cross-domain featurizer 115, and/or the machine learning model 116 can include a set of instructions performed by the processor 113. In some configurations, each of the domain profile multiplexer 114, the cross-domain featurizer 115, and/or the machine learning model 116 can include one or more integrated circuits (ICs) in the processor 113 that perform the set of instructions.

The domain profile multiplexer 114 can receive data including structured enterprise data in multiple data domains (also referred to as 'domain profile') such as, for example, a diet data domain, a fitness data domain, a medical record data domain, a financial data domain, a telecommunication network data domain, a demographic data domain, a customer churn data domain, and/or the like. The domain profile multiplexer 114 can analyze the data in the multiple data domains and identify columns with similar parameter(s) (e.g. email address, phone number, and/or the like). The domain profile multiplexer 114 can then identify and select at least one column from each data domain that substantially match. Here, substantially matching can be, for example, being the exact same data, having a numerical value that have an absolute difference less than 1, having strings that match 70%, 80%, 90%, 99%, and/or the like. Once the domain profile multiplexer 114 has identified the matching between at least two columns, the dataset can be arranged from the multiple domains into column families within a multi-domain data (also referred to as 'multi-domain profile').

The cross-domain featurizer 115 can receive the multi-domain data generated above by the domain profile multiplexer 114. The domain featurizer 114 can analyze the multi-domain data to determine data types within the multi-domain data (e.g., structured/unstructured, number/Boolean, free form text, numbers, dates, structured strings, and/or the like). The domain featurizer 114 can separate structured data from the multi-domain data as initial features to be input to the artificial intelligence (AI) models/machine learning models to be trained, deployed, and/or tested. In some instances, the cross-domain featurizer 115 can do one or more transformations (e.g., normalization, trimming, and/or the like) on the initial features before training the machine learning models.

The machine learning model 116 can receive the initial features as input and can be trained based on these initial features. Then the machine learning model 116, after training, can be deployed to production (e.g., packaged in software to receive fitness data, telecommunication network data, and/or the like, and generate a recommendation, predict revenue, and/or the like). After deployment, the machine learning model 116 can be tested to generate test outcome data that can be used evaluate the features, discard non-performing features (e.g., features that result in less accuracy in the machine learning model), and re-train the machine learning model using the retained features.

The server 170 can be/include one or more compute devices particularly suitable for data storage, data processing, and/or data communication. For example, the server 170 can include a network of electronic memories, a network of magnetic memories, a server(s), a blade server(s), a storage area network(s), a network attached storage(s), deep learning computing servers, deep learning storage servers, and/or the like. The server 170 can include a memory 171, a communication interface 172 and/or a processor 173 that are structurally and/or functionally similar to the memory 111, the communication interface 112, and/or the processor 113 as shown and described with respect to the cross-domain machine learning device 110. The memory 171 can store data, the processor 173 can analyze the data (e.g., clean, normalize, process, and/or organize the data), and the communication interface 172 can receive/transmit the data from/to the cross-domain machine learning device 110 and/or the user device 160 via the network 150.

The user device 160 is a compute device (e.g., a laptop, a desktop, a tablet, and/or the like) in a store, a location, an event, and/or the like. The user device 160 includes a memory 161, a communication interface 162, and a processor 163. The memory 161, the communication interface 162, and the processor 163 can be structurally and/or functionally similar to the memory 111, the communication interface 112, and/or the processor 113 as shown and described with respect to the cross-domain machine learning device 110.

The user device 160 can be operatively coupled to the cross-domain machine learning device 110 and/or the server 170 via the network 150.

In use, the cross-domain machine learning device 110 can receive data (e.g., from the server 170, the user device 160, a peripheral device (not shown) operatively connected to the cross-domain machine learning device 110, a compute device coupled to the network 150, and/or the like). The data can include data from multiple data domains. The cross-domain machine learning device 110 can then use a domain profile multiplexer 114 to identify and select at least one column in the data for each data domain that substantially matches other data domain. The domain profile multiplexer 114 can the arrange the data from the multiple domains into column families within a multi-domain data (as shown and described in FIG. 4). The cross-domain featurizer 115 can then receive the multi-domain data, identify structured data within the multi-domain data, and generate a set of features for training at least one machine learning model 116 (e.g., an artificial neural network, a convolutional neural network, a residual neural network, a decision tree, and/or the like). The machine learning model 116 is then deployed to production.

After deployment, the machine learning model 116 is tested to evaluate the set of features, discard non-performing features (e.g., features that result in less accuracy in the machine learning model), and re-train the machine learning model based on the retained features. In some instances, the multiple data domains can include a primary data domain (also 'first data domain') and a secondary data domain (also 'second data domain'). The cross-domain machine learning device 110 can replace a first set of under-performing (or 'non-performing') features from features in the secondary data domain. The under-performing (or 'non-performing') features can be identified by evaluating the at least one machine learning model. The cross-domain machine learning device 110 can replace a second set of under-performing features from features in the primary data domain after the secondary data domain. This is because, in some instances, a priority is given to maintaining features for the primary data domain—that is the data domain used for a primary application (e.g., giving priority or emphasis to fitness data).

The cross-domain machine learning device 110 can iteratively perform (e.g., at predetermined time intervals, after collecting a predetermined number of data, and/or the like) a cycle of actions including feature selection, training, testing, replacing under-performing features to improve a performance of the machine learning model (e.g., improved accuracy, reduced processing requirements, processing speed, and/or the like).

In one example, the user device 160 can be a personal compute device (e.g., a laptop, a smartphone, a tablet, a desktop, and/or the like) of a client of the multi-domain machine learning device 110. The personal compute device can include, for example, a graphical user interface so that the client can operate the multi-domain machine learning device 110 using an application programming interface (API) via the communication interface 162. In another example, the server 170 can be/include a storage server that can store a large amount of data (e.g., terabytes of data, petabytes of data, and/or the like) including, for example, diet data, fitness data, medical record data, financial data, telecommunication network data, demographic data, customer churn data, and/or the like. In yet another example, the server 170 can be an application server that can, for example, deploy a machine learning model trained and/or managed by the multi-domain machine learning device 110.

Although the cross-domain machine learning device 110, the server 170, and the user device 160 are shown and described with respect to FIG. 1 as singular devices, it should be understood that in some embodiments, one or more cross-domain machine learning devices, one or more servers, and/or one or more user devices can be used.

FIG. 2 is a flowchart showing a cross-domain machine learning method 200, according to an embodiment. In some embodiments, the cross-domain machine learning method 200 can be performed by a cross-domain machine learning device (e.g., the cross-domain machine learning device 110 as shown and described with respect to FIG. 1). At 201, a first set of data columns and a second set of data columns that are the same or substantially similar data types can be identified, respectively, in a first data domain and in a second data domain. Here, substantially similar data types can be, for example, data types for the same application (e.g., a mobile phone number and a home phone number can be used for contacting someone and are therefore similar data types; a mobile phone number and a zip code, on the other hand, do not have the same application are not similar data types). In some instances, instead of two data domains, three data domains, ten data domains, 100 data domains, and/or any number of data domains can be processed by the cross-domain machine learning method 200. For example, the data domains can be from a diet data domain, a fitness data domain, a medical record data domain, a financial data domain, a network data domain, a demographic data domain, a customer churn data domain, and/or the like.

At 202, (1) a first subset of data columns from the first set of data columns in the first data domain and that have a plurality of parameters. and (2) a second subset of data columns from the second set of data columns in the second data domain and that have a plurality of parameters that match the plurality of parameters of the first subset of data column can be selected. At 203, arrange the first subset of data columns and the second set of data columns into a multi-domain dataset. Each column in the multi-domain dataset includes an attribute from the first set of data columns or the second set of data columns. Each row in the multi-domain dataset includes multi-domain data from the first data domain and the second data domain.

At 204, each column in the multi-domain dataset can be classified into structured data or unstructured data. In some instances, the unstructured data can be discarded from the multi-domain dataset (e.g., removed from the memory 111 of the cross-domain machine learning device 110 as shown and described with respect to FIG. 1). Columns with structured data are mapped to a set of features for training at least one machine learning model. Each feature from the set of features is associated with the first data domain or the second data domain. At 205, a first set of under-performing features from a subset of features from the set of features in the second data domain can be replaced with, for example, alternative features (e.g., randomly sampled features, predetermined features, and/or the like). The under-performing features are identified by evaluating the at least one machine learning model (e.g., for accuracy of an output of the machine learning model, a speed of generating the output, and/or the like). In some instances, the at least one machine learning model can be evaluated by having an evaluation data set including input data and expected output data. The machine learning model can receive the input data from the evaluation data and generate estimated output data and metadata associated with generation of the estimated output data (e.g., a memory usage of the machine learning model, a runtime of the machine learning model, and/or the like).

The estimated output data can be compared with the expected output data (e.g., by calculating an absolute difference between the two) to calculate an accuracy for the machine learning model. The accuracy of the machine learning model and the metadata associated with generation of the estimated output data can be used to evaluate the machine learning model (e.g., generate an indication of performance for the machine learning model from 1 to 100).

At 206, a second set of under-performing features from a subset of features from the set of features in the first data domain can be replaced with, for example, alternative features, after replacing the first set of under-performing features. The first set of under-performing features and/or the second set of under-performing features are identified by evaluating the at least one machine learning model. A predetermined portion of features from the subset of features from the set of features in the first data domain is retained. At 207, the at least one machine learning model can be re-trained after replacing the first set of under-performing features and the second set of under-performing features with the alternative features.

FIG. 3 is a schematic illustration of a domain profile, according to an embodiment. The domain profile can be or include, for example, a user profile describing a user behavior in a particular industry. In one example, telecom profile domain can include the user's behavior in mobile phone usage (e.g., average length of calls, typical days and times of calls, etc.). In another example, fitness profile domain can include an athlete's activities and/or behavior in a gym (e.g., attendance in classes in the gym, average class length, etc.). In yet another example, an education profile domain can include a student's attendance of online classes.

As shown in FIG. 3, a domain profile (also referred to as 'data domain') for a user can include an identifier for the user, followed by any number of attributes specific for that domain. The user identifier can be unique to the user (within a multi-domain machine learning device) and recognizable across domains. For example, the user identifier can be or include a phone number, an email address, a social security number, a representation of a fingerprint, and/or the like. When using a machine learning model to solve a problem mainly for a particular domain, that particular domain can be called the primary domain. Thereafter, available data for any number of users from one or more secondary domains, can be fused together to produce a multi-domain dataset.

Figure 4:
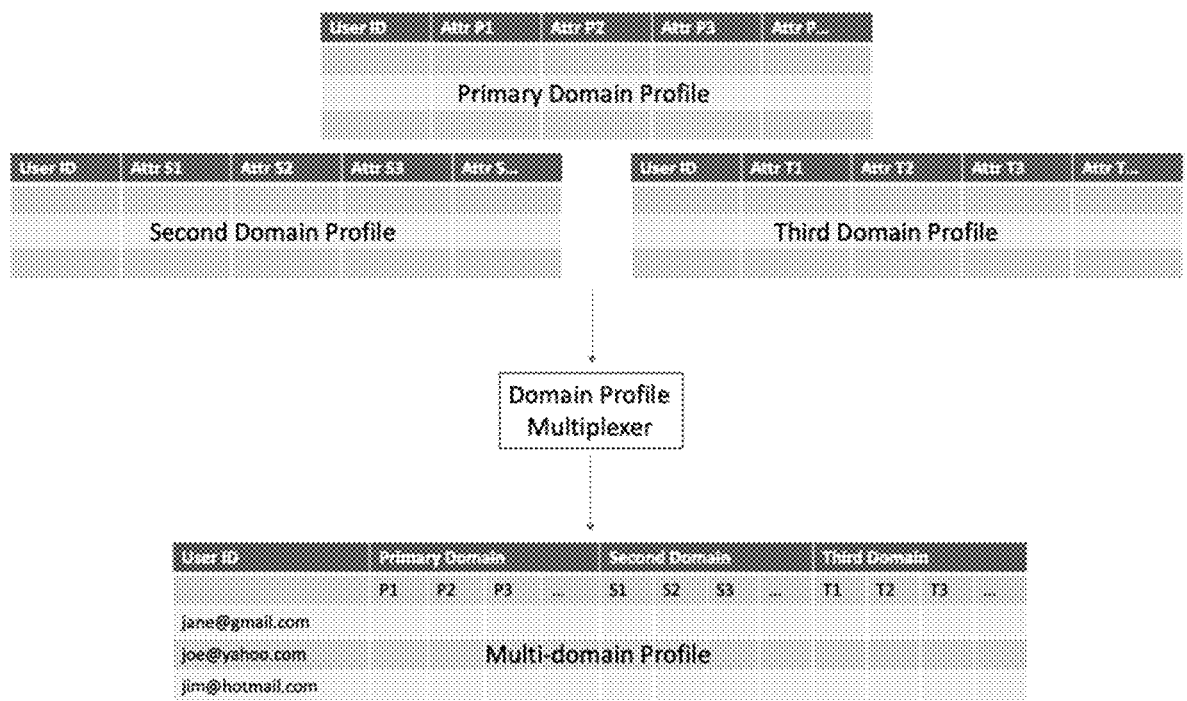
FIG. 4 is a schematic illustration of a method of fusing multiple domain profiles, according to an embodiment.

FIG. 4 is a schematic illustration of a method of fusing or merging multiple domain profiles, according to an embodiment. In some embodiments, the method of fusing the multiple domain profiles can be performed by the domain profile multiplexer 114 of the multi-domain machine learning device 110 of FIG. 1. As shown, in some instances, a primary domain profile (also "first domain profile" or "first data domain"), a second domain profile (also "second domain profile" or "second data domain"), and a third domain profile (also "third domain profile" or "third data domain") are fused or merged to produce a multi-domain profile (multi-domain data). Here, fusing or merging domain profiles (data domains) can be defined as finding and selecting a subset of data (rows) that have at least one common attribute (columns). In one example, the set of common attributes can be or include an identifier attribute, an email address, a phone number, and/or the like. The subset of data (rows) that have the at least one common attribute are selected and concatenated to produce the multi-domain profile and the remaining rows of data (not selected) are discarded.

In one example, as shown in FIG. 4, the primary domain profile can include 1000 users (rows), the second domain profile can include 2000 (rows), and the third domain profile can include 1500 users (rows). The resulting multi-domain profile produced from the primary domain, the second domain profile, and the third domain profile can include 900 users (rows) because only data of 900 user (rows) had the at least one common attribute (e.g., a matching identifier number).

Although, in some embodiments, columns of domain profiles are shown and described as data attributes and the rows of domain profiles are shown and described as users associated to the data attributes; in some embodiments, the columns of the domain profiles can represent the users and the rows of the domain profiles can represent the data attributes.

Figure 5:
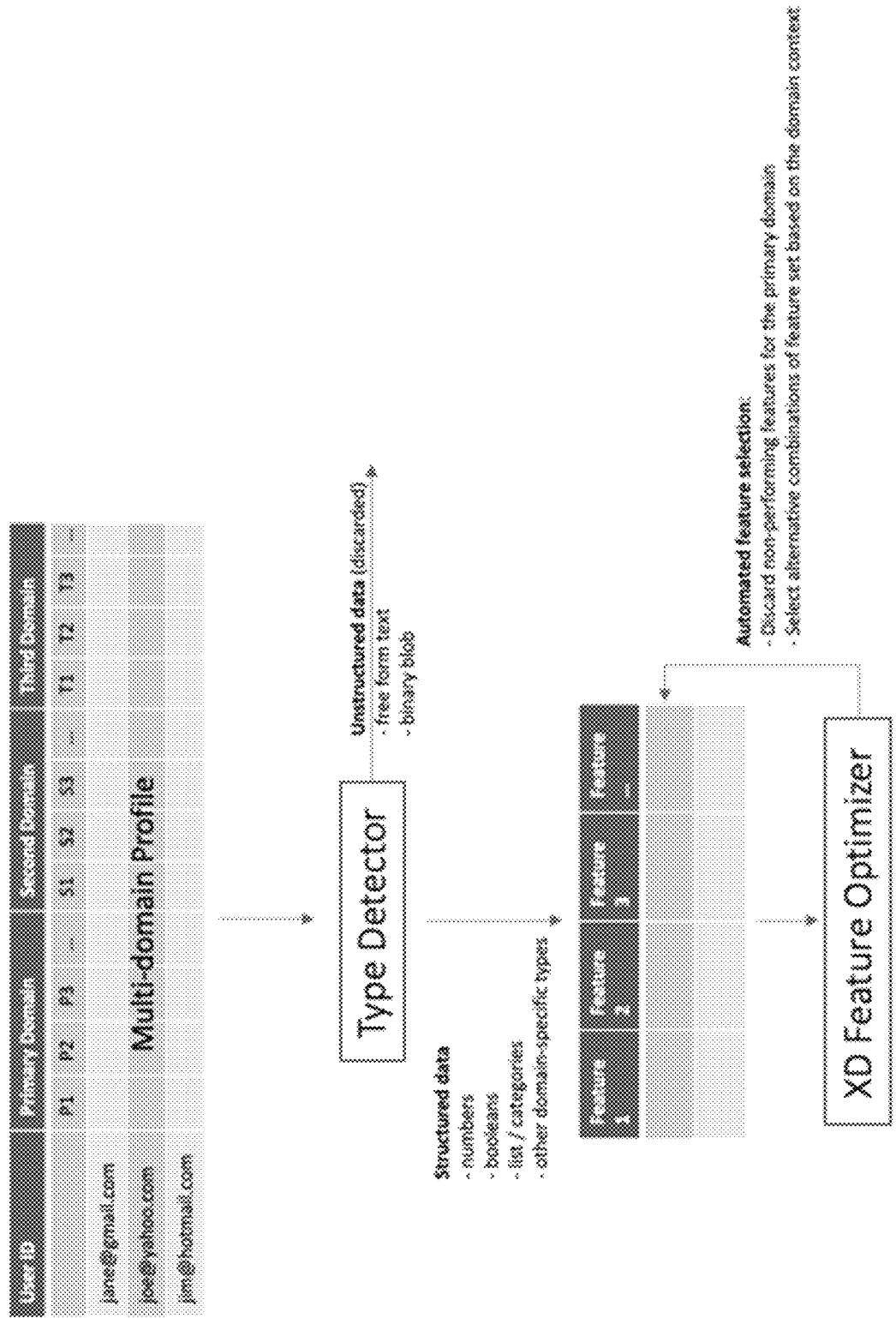
FIG. 5 is a schematic illustration of a domain featurizer, according to an embodiment.

FIG. 5 is a schematic illustration of a domain featurizer, according to an embodiment. The domain featurizer (e.g., the domain featurizer 115 in FIG. 1) can include a type detector and a feature optimizer (also "XD feature optimizer"). Input multi-domain profile data is fed to the type detector. The type detector can analyze data tabs, columns, and/or rows, and can separate them into structured data (e.g., including numbers, Boolean values, lists, categories, and/or other types of domain-specific structured data) and/or unstructured data (e.g., including free form text, binary bloc, and/or other types of domain-specific unstructured data). Tabs, columns, and/or rows with structured data can be mapped to features of a target machine learning model (e.g., a convolutional neural network) with any desirable transformations (e.g., normalization of the value in the range of 0 to 1).

As shown in FIG. 5, after the machine learning model is deployed to production that processes data in a primary domain(s), the feature optimizer can be configured to discard non-performing features for a secondary domain(s) and then discard non-performing features for the primary domain(s). When trying alternative feature combinations, in some instances, a significant portion/number of features (e.g., 70% of features, 80% of features, 90% of features, and/or the like) from the primary domain(s) can be retained. Because, in some applications, it is advantageous to put a focus on an outcome(s) about at least one specific business problem (i.e., primary domain(s)) emphasizing on retaining features from the primary domain can help the machine learning model to generate more accurate results for that at least one specific business problem. The machine learning model can be re-trained on alternative combinations of features and then tested as described in FIG. 1. Steps of (a) discarding non-performing features in the secondary domain(s), (b) discarding non-performing features in the primary domain (s), (c) selecting alternative features and (d) re-training the machine learning model, can be iteratively repeated to repeatedly improve the performance of the machine learning model.

The disclosed embodiments are not representative of all claimed innovations. As such, certain aspects of the disclosure have not been discussed herein. That alternate embodiments may not have been presented for a specific portion of the innovations or that further undescribed alternate embodiments may be available for a portion is not to be considered a disclaimer of those alternate embodiments. Thus, it is to be understood that other embodiments can be utilized, and functional, logical, operational, organizational, structural and/or topological modifications may be made without departing from the scope of the disclosure. As such, all examples and/or embodiments are deemed to be non-limiting throughout this disclosure.

Some embodiments described herein relate to methods. It should be understood that such methods can be computer implemented methods (e.g., instructions stored in memory and executed on processors). Where methods described above indicate certain events occurring in certain order, the ordering of certain events can be modified. Additionally, certain of the events can be performed repeatedly, concurrently in a parallel process when possible, as well as performed sequentially as described above. Furthermore, certain embodiments can omit one or more described events.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to, magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Some embodiments and/or methods described herein can be performed by software (executed on hardware), hardware, or a combination thereof. Hardware modules may include, for example, a general-purpose processor, a field programmable gate array (FPGA), and/or an application specific integrated circuit (ASIC). Software modules (executed on hardware) can be expressed in a variety of software languages (e.g., computer code), including C, C++, Java™ Ruby, Visual Basic™, and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. For example, embodiments can be implemented using Python, Java, JavaScript, C++, and/or other programming languages and software development tools. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

In order to address various issues and advance the art, the entirety of this application (including the Cover Page, Title, Headings, Background, Summary, Brief Description of the Drawings, Detailed Description, Claims, Abstract, Figures, Appendices, and otherwise) shows, by way of illustration, various embodiments in which the claimed innovations can be practiced. The advantages and features of the application are of a representative sample of embodiments only and are not exhaustive and/or exclusive. They are presented to assist in understanding and teach the claimed principles.

The drawings primarily are for illustrative purposes and are not intended to limit the scope of the subject matter described herein. The drawings are not necessarily to scale; in some instances, various aspects of the subject matter disclosed herein can be shown exaggerated or enlarged in the drawings to facilitate an understanding of different features.

The acts performed as part of a disclosed method(s) can be ordered in any suitable way. Accordingly, embodiments can be constructed in which processes or steps are executed in an order different than illustrated, which can include performing some steps or processes simultaneously, even though shown as sequential acts in illustrative embodiments. Put differently, it is to be understood that such features may not necessarily be limited to a particular order of execution, but rather, any number of threads, processes, services, servers, and/or the like that may execute serially, asynchronously, concurrently, in parallel, simultaneously, synchronously, and/or the like in a manner consistent with the disclosure. As such, some of these features may be mutually contradictory, in that they cannot be simultaneously present in a single embodiment. Similarly, some features are applicable to one aspect of the innovations, and inapplicable to others.

The phrase "and/or," as used herein in the specification and in the embodiments, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements can optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the embodiments, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the embodiments, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of." "Consisting essentially of," when used in the embodiments, shall have its ordinary meaning as used in the field of patent law.

What is claimed is:

1. A method, comprising:
identifying a first set of data columns in a first data domain having a plurality of data types;
identifying a second set of data columns in a second data domain having a plurality of data types that are the same as or substantially similar to the plurality of data types of the first data domain;
selecting (1) a first subset of data columns from the first set of data columns in the first data domain and having a plurality of parameters, and (2) a second subset of data columns from the second set of data columns in the second data domain and having a plurality of parameters matching the plurality of parameters of the first subset of data columns;
arranging the first subset of data columns and the second set of data columns into a multi-domain dataset, each column in the multi-domain dataset including an attribute from the first set of data columns or an attribute the second set of data columns, each row in the multi-domain dataset including multi-domain data from the first data domain and the second data domain;
classifying each column in the multi-domain dataset into structured data or unstructured data, columns in the multi-domain dataset with structured data being mapped to a set of features for training at least one machine learning model, each feature from the set of features associated with the first data domain or the second data domain;
replacing a first set of under-performing features from a subset of features from the set of features in the second data domain, the under-performing features from the first set of under-performing features identified by evaluating the at least one machine learning model;
replacing a second set of under-performing features from a subset of features from the set of features in the first data domain, after the replacing the first set of under-performing features, the under-performing features from the second set of under-performing features identified by evaluating the at least one machine learning model, a predetermined portion of features from the subset of features from the set of features in the first data domain being retained; and
re-training the at least one machine learning model after replacing the first set of under-performing features and the second set of under-performing features.

2. The method of claim 1, wherein the first data domain includes telecom data and the second data domain includes fitness data.

3. The method of claim 1, wherein the multi-domain dataset includes a multi-domain profile.

4. The method of claim 1, wherein the multi-domain dataset includes a multi-domain profile generated by concatenating rows in the multi-domain dataset having a common attribute.

5. The method of claim 1, wherein the plurality of parameters of the first subset of data columns includes at least one of an email address or a phone number.

6. The method of claim 1, wherein the first data domain includes at least one of a diet data domain, a medical record domain, a financial domain, a network domain, a demographic domain, or a customer domain.

7. The method of claim 1, wherein the under-performing features from the first set of under-performing features decrease an accuracy of an output generated by the at least one machine learning model.

8. An apparatus, comprising:
a memory; and
a processor operatively coupled to the memory, the processor configured to:
identify a first set of data columns in a first data domain having a plurality of data types;
identify a second set of data columns in a second data domain having a plurality of data types that are the same as or substantially similar to the plurality of data types of the first data domain;
select (1) a first subset of data columns from the first set of data columns in the first data domain and having a plurality of parameters, and (2) a second subset of data columns from the second set of data columns in the second data domain and having a plurality of parameters matching the plurality of parameters of the first subset of data columns;
arrange the first subset of data columns and the second set of data columns into a multi-domain dataset, each column in the multi-domain dataset including an attribute from the first set of data columns or an attribute the second set of data columns, each row in the multi-domain dataset including multi-domain data from the first data domain and the second data domain;
classify each column in the multi-domain dataset into structured data or unstructured data, columns in the multi-domain dataset with structured data being mapped to a set of features for training at least one machine learning model, each feature from the set of features associated with the first data domain or the second data domain;
replace a first set of under-performing features from a subset of features from the set of features in the second data domain, the under-performing features from the first set of under-performing features identified by evaluating the at least one machine learning model;
replace a second set of under-performing features from a subset of features from the set of features in the first data domain, after the replacing the first set of under-performing features, the under-performing features from the second set of under-performing features identified by evaluating the at least one machine learning model, a predetermined portion of features from the subset of features from the set of features in the first data domain being retained; and
re-train the at least one machine learning model after replacing the first set of under-performing features and the second set of under-performing features.

9. The apparatus of claim 8, wherein evaluating the under-performing features from the first set of under-performing features includes determining a speed the at least one machine learning model generating an output, the under-performing features from the first set of under-performing features identified based on the speed.

10. The apparatus of claim 8, wherein the first data domain includes telecom data and the second data domain includes fitness data.

11. The apparatus of claim 8, wherein the multi-domain dataset includes multi-domain profiles.

12. The apparatus of claim 8, wherein the multi-domain dataset includes multi-domain profiles generated by concatenating rows in the multi-domain dataset having a common attribute.

13. The apparatus of claim 8, wherein the plurality of parameters of the first subset of data columns includes at least one of an email address or a phone number.

14. The apparatus of claim 8, wherein the first data domain includes at least one of a diet data domain, a medical record domain, a financial domain, a network domain, a demographic domain, or a customer domain.

15. The apparatus of claim 8, wherein evaluating the under-performing features from the first set of under-performing features includes determining an accuracy of an output generated by the at least one machine learning model, the under-performing features from the first set of under-performing features identified based on the accuracy.

16. A non-transitory, processor readable medium storing instructions that, when executed by a processor, cause the processor to:
   identify a first set of data columns in a first data domain having a plurality of data types;
   identify a second set of data columns in a second data domain having a plurality of data types that are the same as or substantially similar to the plurality of data types of the first data domain;
   select (1) a first subset of data columns from the first set of data columns in the first data domain and having a plurality of parameters, and (2) a second subset of data columns from the second set of data columns in the second data domain and having a plurality of parameters matching the plurality of parameters of the first subset of data columns;
   arrange the first subset of data columns and the second set of data columns into a multi-domain dataset, each column in the multi-domain dataset including an attribute from the first set of data columns or an attribute the second set of data columns, each row in the multi-domain dataset including multi-domain data from the first data domain and the second data domain;
   classify each column in the multi-domain dataset into structured data or unstructured data, columns in the multi-domain dataset with structured data being mapped to a set of features for training at least one machine learning model, each feature from the set of features associated with the first data domain or the second data domain;
   replace a first set of under-performing features from a subset of features from the set of features in the second data domain, the under-performing features from the first set of under-performing features identified by evaluating the at least one machine learning model;
   replace a second set of under-performing features from a subset of features from the set of features in the first data domain, after the replacing the first set of under-performing features, the under-performing features from the second set of under-performing features identified by evaluating the at least one machine learning model, a predetermined portion of features from the subset of features from the set of features in the first data domain being retained; and
   re-train the at least one machine learning model after replacing the first set of under-performing features and the second set of under-performing features.

17. The non-transitory, processor readable medium of claim 16, wherein the first data domain includes telecom data and the second data domain includes fitness data.

18. The non-transitory, processor readable medium of claim 16, wherein the under-performing features from the first set of under-performing features decrease an accuracy of an output generated by the at least one machine learning model.

19. The non-transitory, processor readable medium of claim 16, wherein the plurality of parameters of the first subset of data columns includes an email address and a phone number.

20. The non-transitory, processor readable medium of claim 16, wherein the multi-domain dataset includes multi-domain profiles.

\* \* \* \* \*